US012802473B2

(12) United States Patent
Spangenberg

(10) Patent No.: US 12,802,473 B2
(45) Date of Patent: Nov. 17, 2026

(54) METHOD FOR AUTHENTICATING AN IMAGE SENSOR

(71) Applicants: CARIAD SE, Wolfsburg (DE); Robert Bosch GmbH, Stuttgart (DE)

(72) Inventor: Robert Spangenberg, Berlin (DE)

(73) Assignees: CARIAD SE, Wolfsburg (DE); ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/952,894

(22) Filed: Nov. 19, 2024

(65) Prior Publication Data

US 2025/0166400 A1 May 22, 2025

(30) Foreign Application Priority Data

Nov. 20, 2023 (DE) .................... 10 2023 132 251.6

(51) Int. Cl.
*G06V 20/90* (2022.01)
*G06F 21/44* (2013.01)
*G06V 20/00* (2022.01)
*G06V 20/59* (2022.01)

(52) U.S. Cl.
CPC .............. *G06V 20/90* (2022.01); *G06F 21/44* (2013.01); *G06V 20/59* (2022.01); *G06V 20/95* (2022.01)

(58) Field of Classification Search
CPC ........ G06V 20/90; G06V 20/29; G06V 20/95; G06F 21/44
USPC ............................................................ 726/17
See application file for complete search history.

(56) References Cited

U.S. PATENT DOCUMENTS 7,280,141 B1 * 10/2007 Frank .................... H04N 25/67 348/241
8,368,780 B2 * 2/2013 Fischer .................. H04N 25/67 348/241
11,127,104 B1 * 9/2021 Diedrich ................ G06T 1/005
(Continued)

FOREIGN PATENT DOCUMENTS

DE 102019134703 A1 6/2021
EP 4 149 054 A1 3/2023
WO 2022/058345 A1 3/2022

OTHER PUBLICATIONS

"Image noise", Wikipedia, The Free Encyclopedia. Processing status: Aug. 26, 2023. URL: https://en.wikipedia.org/w/index.php?title=Image_noise&oldid=1172393202 (retrieved on Jun. 10, 2024).

*Primary Examiner* — Dant B Shaifer Harriman
(74) *Attorney, Agent, or Firm* — Seed Intellectual Property Law Group LLP

(57) ABSTRACT

The disclosure relates to a computer-implemented method for authenticating an image sensor, a system, a computer-readable storage medium, and a motor vehicle. The method includes providing a camera for a motor vehicle that includes an image sensor. Subsequently, a first noise profile of the image sensor is ascertained and is stored on a data memory. The method also includes ascertaining a second noise profile of the image sensor. Subsequently, the first noise profile is compared to the second noise profile and the image sensor is authenticated if a predetermined correspondence is determined in comparing the first noise profile to the second noise profile.

22 Claims, 1 Drawing Sheet

(56) References Cited

U.S. PATENT DOCUMENTS

| | | | | |
|---|---|---|---|---|
| 11,636,700 | B2 * | 4/2023 | Hassani | G06F 18/217<br>382/115 |
| 2003/0122969 | A1 * | 7/2003 | Higuchi | H04N 25/60<br>348/E5.079 |
| 2005/0036045 | A1 * | 2/2005 | Fuchs | H04N 17/002<br>348/E5.081 |
| 2008/0152248 | A1 * | 6/2008 | Kelly | H04N 25/683<br>348/241 |
| 2009/0090577 | A1 * | 4/2009 | Takahashi | B60K 28/063<br>340/576 |
| 2014/0310739 | A1 * | 10/2014 | Ricci | G06F 16/951<br>725/75 |
| 2015/0271456 | A1 * | 9/2015 | Kostepen | H04N 7/181<br>348/148 |
| 2020/0051218 | A1 * | 2/2020 | Hyun | G06T 5/70 |
| 2022/0374642 | A1 * | 11/2022 | Hassani | G06V 10/56 |

* cited by examiner

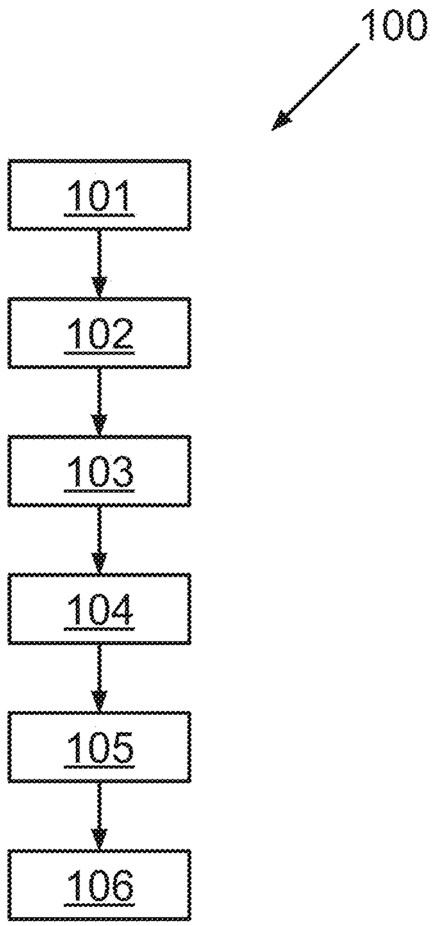
100
101
102
103
104
105
106

METHOD FOR AUTHENTICATING AN IMAGE SENSOR

BACKGROUND

Technical Field

The disclosure relates to a computer-implemented method for authenticating an image sensor, to a system, to a computer program, to a computer-readable storage medium as well as to a motor vehicle.

Description of the Related Art

For the employment of cameras and the image sensors thereof at a control device of a motor vehicle, it can be relevant that the control device can determine if the correct camera is connected to the control device. This is in particular a cybersecurity requirement. Therein, the image sensor should be authenticated. Essentially, the risk is to be reduced, in particular minimized, that a non-approved camera, in particular a non-authenticated image sensor, is used by the control device. Therefore, the control device should be able to confirm the identity of the camera, in particular of the image sensor, to be allowed to use an image sensor.

EP 4 149 054 A1 discloses a camera system in a motor vehicle, wherein it can be allowed to determine an exchange of an image sensor of the camera system by an encrypted common secret between camera system and a control unit of the motor vehicle.

WO 2022/058345 A1 discloses a method for a camera system of a motor vehicle. Therein, the camera system comprises a first camera module with a first identification number, a second camera module with a second identification number and an electronic control unit. Based on the first and second identification numbers, a hash value is respectively generated.

However, it is still possible to for example copy or counterfeit an identification number of a camera, whereby the risk is in turn increased that a non-authorized camera, in particular the image sensor thereof, is used for a control device of a motor vehicle.

BRIEF SUMMARY

Therefore, embodiments of the present disclosure improve the authentication of a camera, in particular of an image sensor of the camera, by a control device.

Embodiments of the present disclosure provide a computer-implemented method for authenticating an image sensor, a system, a computer program, a computer-readable storage medium as well as a motor vehicle.

A first aspect relates to a computer-implemented method for authenticating an image sensor. In a first step, providing a camera for a motor vehicle is effected, which comprises an image sensor. Subsequently, a first noise profile of the image sensor is ascertained and it is stored on a data memory. In a further step, ascertaining a second noise profile of the image sensor of the camera (i.e., of that image sensor, which is assumed to be the same image sensor, from which the first noise profile is derived) is effected. Subsequently, the stored first noise profile is compared to the ascertained second noise profile and the image sensor is authenticated if a predetermined correspondence can be determined in comparing the stored first noise profile to the ascertained second noise profile.

The image sensor converts incident light into a measurable electrical signal. Thus, a digital photo is composed of many individual image points, the so-called pixels. Each pixel corresponds to a cell on the camera sensor. The number of the pixels or cells is typically indicated in millions of pixels (megapixels). In each of these cells, the amount of the light impinging there is measured via the voltage. This works because the incident photons are proportional to the resulting voltage.

Under ideal conditions, each sensor cell generates the same signal at the same incident amount of light. However, in practice, this is not the case: The photosensitive material of the sensor can for example contain impurities, whereby a lower part of the light is converted in the affected pixel. Another factor are size differences of the individual sensor cells caused by manufacture. Fluctuations in the nanometer range already result in differences in the brightness of the pixels in individual sensor cells.

Larger cells receive more light and therefore generate brighter pixels and, inversely, smaller cells generate darker pixels. These inaccuracies overlap and thus generate a fixed pattern, thus a noise profile, at minute brightness deviations, which occur in the image. This noise profile arises in the sensor manufacture and barely changes even after years of operation of the camera. Thus, each new image, which the camera produces, has embedded this noise profile in the image content even after years.

Both factors are particularly interesting because they randomly arise during the manufacture. Even if two image sensors are manufactured in a factory directly one after the other, they do not have the same noise profile: An image sensor has a respectively unique pattern. The noise profile is often referred to as fingerprint since it is temporally invariable just as the human fingerprint and as specific as it can be used for the identification of a device.

Therein, the idea is underlying the disclosure that a fingerprint is established from the noise distribution of the pixels of the image sensor and this fingerprint is written into a data memory (for example a storage area of the camera, in particular of the image sensor). This can be performed in training the camera during a vehicle production or in the service.

The noise profile appears as slight differences in adjacent image points, but which are invisible with the naked eye. However, the noise profile can be ascertained with the aid of the digital signal processing. Since the noise profile is so weak, several images are required to reliably extract the noise profile. In simplified terms, the average value of a pixel over many images is considered. If a pixel is slightly brighter or darker than the average of all of the pixels over many images, this can be ascribed to the above described manufacturing differences. Since the brightness differences are only very low, a single pixel in a single image can deviate from the actual pattern. By averaging over many images, however, a stable fingerprint, i.e., a noise profile, nevertheless results.

If an image sensor is now (maliciously) exchanged and pretends to be the original image sensor, then, the noise fingerprint of the image sensor can be ascertained and compared to the stored noise fingerprint. If the image sensor has been exchanged, then, the stored noise fingerprint will be substantially different from the ascertained noise fingerprint to a predetermined extent, and it can be concluded that the currently used image sensor has been exchanged with a certain probability.

Thus, hardware for a cryptographic solution can be saved since the implementation can be implemented in software. A special hardware unit of the camera, for example integrated in the image sensor, is not required. The realization is especially effected in software. In context of the camera, only a data memory, preferably in the form of an OTP (One Time Pad, storage area on the sensor, once writable) on the image sensor is in particular required. Alternatively or additionally, it can also be provided that a data memory, in particular in the form of an EEPROM, which is arranged at or in the camera head, is used. Further, storing noise profiles can also be effected on a permanent memory, which is arranged at or in a control device of the motor vehicle.

A second aspect relates to a system comprising means for executing the method according to the first aspect.

A third aspect relates to a computer program, which, upon execution of the program by a computer, causes it to execute the method according to the first aspect.

A fourth aspect relates to a computer-readable storage medium, which includes commands, which, upon execution by a computer, cause it to execute the method according to the first aspect.

A fifth aspect relates to a motor vehicle comprising means for executing the method according to the first aspect, a system according to the second aspect, a computer program according to the third aspect or a computer-readable storage medium according to the fourth aspect.

According to an advantageous embodiment, the image sensor is authenticated if the correspondence is present at least by 60%, preferably by 70%, further preferably by 80% and most preferably at least by 90%. By presetting how high the correspondence in comparing the stored first noise profile to the ascertained second noise profile is, according to camera type, in particular image sensor, a range can be specified, within which a deviation of the second noise profile from the first noise profile is tolerable or within which the conclusion can be made that it is the same image sensor.

According to another advantageous embodiment, a control device for a motor vehicle comprises the data memory. In case that the control device comprises the data memory, matching of the two noise profiles can be particularly simply effected. Hereto, the second noise profile is preferably requested by the control device, i.e., that it at least partially controls the camera, such that a noise profile can be ascertained based on the camera behavior. In particular, it can be provided that the control device receives data from the camera, in particular the image sensor thereof, and ascertains the noise profile in the control device and based on the received data.

According to a further advantageous embodiment, the comparing and authenticating are performed by the control device. In this manner, it can be achieved that a computationally intensive device as a control device for a motor vehicle usually represents it, performs comparison of noise profiles on the one hand. Thus, the camera only requires lower computing resources since expensive computing operations for comparing the noise profiles are not required. Furthermore, by authenticating by the control device, it can be achieved that a substantially trustable entity, the camera and in particular the image sensor thereof, confirms the authenticity of the image sensor. Thus, the probability of a manipulation of the image sensor of the camera can be reduced, in particular minimized.

According to a further advantageous embodiment, the camera comprises the data memory. In this case, it can be that the image sensor of the camera can be exchanged. But the data memory usually remains at the camera since it is in particular fixedly installed or connected to it, whereby the counterfeit protection of the data memory is increased. Furthermore, the noise profile can be stored in particularly simple and targeted manner.

According to a further advantageous embodiment, the data memory of the camera is not overwritable when the step of storing the ascertained noise profile on the data memory of the camera has been effected. This in particular reduces the risk that the noise profile is manipulated or overwritten.

According to a further advantageous embodiment, the first noise profile is encrypted with a predetermined key and the key for decrypting of the encrypted first noise profile is provided to the control device. By encrypting the first noise profile, the risk can be reduced, in particular minimized, that the noise profile is manipulated. For example, it is thus more improbable that a malicious change or adaptation of the first noise profile in particular to the second noise profile is effected. Thus, the probability can be increased that the step of authenticating is effected based on correct data.

According to a further advantageous embodiment, the first noise profile is stored in encrypted manner. If the first noise profile is also stored in encrypted manner, the probability that the step of authenticating is effected based on correct data, can be additionally increased. Manipulation of the first noise profile is also additionally impeded.

According to a further advantageous embodiment, the first noise profile and the second noise profile are substantially ascertained based on the same approach. Thus, it can substantially be achieved that the first noise profile can be particularly effectively compared to the second noise profile.

According to a further advantageous embodiment, the first noise profile and the second noise profile are ascertained based on the Photo Response Non-Uniformity of the image sensor. The Photo-Response Non-Uniformity (PRNU) is a representation of the uniformity of the response of a camera to light. Therefore, it can be reasonable to establish a noise profile based on the PRNU according to camera, image sensor and/or environment of the camera.

According to a further advantageous embodiment, the first noise profile and the second noise profile are ascertained based on the Dark Signal Non-Uniformity of the image sensor. DSNU provides a coarse numerical indication of the quality of a background image with regard to patterns or structures, which can sometimes be present. Therefore, it can also be reasonable to establish a noise profile based on the DSNU according to camera, image sensor and/or environment of the camera.

According to a further advantageous embodiment, the first noise profile and/or the second noise profile can be effected based on substantially black pixels. Therein, black pixels represent pixels of the image sensor, which substantially no or too low ambient light reaches. Based thereon, particularly distinctive noise profiles can preferably be generated.

For application cases or application situations, which can arise in the method and are not explicitly described here, it can be provided that an error message and/or a request for inputting a user feedback are output and/or a default setting and/or a predetermined initial state are adjusted according to the method.

The control device for the motor vehicle also belongs to the disclosure. The control device can comprise a data processing device or a processor device, which is configured to perform an embodiment of the method according to the disclosure. Hereto, the processor device can comprise at least one microprocessor and/or at least one microcontroller and/or at least one FPGA (Field Programmable Gate Array) and/or at least one DSP (Digital Signal Processor). As the microprocessor, a CPU (Central Processing Unit), a GPU (Graphical Processing Unit) or an NPU (Neural Processing Unit) can in particular each be used. Furthermore, the processor device can comprise program code, which is configured to perform the embodiment of the method according to the disclosure upon execution by the processor device. The program code can be stored in a data memory of the processor device. The processor device can be based, e.g., on at least one circuit board and/or on at least one SoC (System on Chip).

Developments of the method according to the disclosure, which comprise features, as they have already been described in context of the developments of the motor vehicle according to the disclosure, also belong to the disclosure. For this reason, the corresponding developments of the method according to the disclosure are not again described here.

The motor vehicle according to the disclosure is preferably configured as an automobile, in particular as a passenger car or truck, or as a passenger bus or motorcycle.

As a further solution, the disclosure also includes a computer-readable storage medium including program code, which, upon execution by a computer or a computer cluster, causes it to execute an embodiment of the method according to the disclosure. The storage medium can be at least partially provided as a non-volatile data memory (e.g., as a flash memory and/or as an SSD—solid state drive) and/or at least partially as a volatile data memory (e.g., as a RAM—random access memory). The storage medium can be arranged in the computer or computer cluster. However, the storage medium can for example also be operated as a so-called Appstore server and/or Cloud server in the Internet. By the computer or computer cluster, a processor circuit with for example at least one microprocessor can be provided. The program code can be provided as a binary code and/or as an assembler code and/or as a source code of a programming language (e.g., C) and/or as a program script (e.g., Python).

The disclosure also includes the combinations of the features of the described embodiments. Thus, the disclosure also includes realizations, which each comprise a combination of the features of multiple of the described embodiments, if the embodiments have not been described as mutually exclusive.

BRIEF DESCRIPTION OF THE SEVERAL VIEWS OF THE DRAWINGS

In the following, embodiments of the disclosure are described.

The FIGURE shows a flow diagram of a computer-implemented method for authenticating an image sensor.

DETAILED DESCRIPTION

The embodiments explained in the following are advantageous embodiments of the disclosure. In the embodiments, the described components of the embodiments each represent individual features of the disclosure to be considered independently of each other, which each also develop the disclosure independently of each other. Therefore, the disclosure also is to include combinations of the features of the embodiments different from the illustrated ones. Furthermore, the described embodiments can also be supplemented by further ones of the already described features of the disclosure.

The FIGURE shows a flow diagram of a computer-implemented method 100 for authenticating an image sensor.

In a first step 101, providing a camera for a motor vehicle is effected, wherein the camera comprises an image sensor. For example, the camera can be formed as a camera for a driver assistance system, i.e., for example for observing the environment of a motor vehicle or the interior of the motor vehicle.

In a further step 102, a first noise profile of the image sensor of the camera is ascertained. Therein, a noise profile is meant in context of the image noise of the camera, in particular the image sensor thereof. Therein, the first noise profile can either have been established during the production process of the image sensor or of the camera. Alternatively, it can also be possible that the noise profile of the image sensor is ascertained at a first point of time. Therein, by ascertaining the noise profile, it can also be understood that an already recorded noise profile of the image sensor is ascertained, i.e., retrieved.

Next, storing 103 the first noise profile on a data memory is effected. Therein, the data memory can be a part of the camera. This is advantageous in case that the noise profile has already been ascertained during the production process of the image sensor. Then, the ascertained noise profile can be immediately stored on the data memory of the camera. Preferably, the data memory of the camera is not overwritable, i.e., that data can only be recorded one time on the data memory. Thus, it can substantially be ensured that the noise profile of the image sensor is also stored on the data memory. Alternatively or additionally, the data memory can also be arranged in the control device.

For storing 103 the first noise profile, it is preferably encrypted with a predetermined key, wherein the key is further preferably provided to the control device for decrypting the encrypted first noise profile.

In a further step 104, a second noise profile of the image sensor is ascertained. Preferably, this is substantially effected on the same basis as the first noise profile has also been established, i.e., that the same parameters and computations are used as they have also been used for ascertaining the first noise profile.

In particular if a certain time interval is present between ascertaining the first noise profile 102 and ascertaining the second noise profile 104, a malicious exchange of the image sensor can have been effected, which should be detectable. In order to allow this, a second noise profile of the image sensor arranged in the camera and used by it is ascertained.

For ascertaining the first noise profile 102 and/or for ascertaining the second noise profile 104, the noise profile can be ascertained based on the Dark Signal Non-Uniformity (DSNU) of the image sensor.

Dark Signal Non-Uniformity is a measure of the degree of the temporally independent fluctuation in the background of a camera image. It provides a coarse numerical indication of the quality of this background image with regard to patterns or structures, which can sometimes be present. Upon imaging at low light, the background quality of a camera can become an important factor.

If photons are not incident on the camera, captured images typically do not display pixel values of 0 grey levels (ADU). Typically, an "offset" value is present, e.g., 100 grey levels, which the camera displays if light is not present, plus or minus the influence of noise on the measurement. Without thorough calibration and correction, however, deviations from pixel to pixel can occur with this fixed offset value. This variant is called "Fixed Pattern Noise." DSNU substantially represents the extent of this fixed pattern noise. It represents the standard deviation of the pixel offset values measured in electrons.

Alternatively or additionally, for ascertaining the first noise profile 102 and/or for ascertaining the second noise profile 104, the noise profile can be ascertained based on the Photo Response Non-Uniformity (PRNU) of the image sensor.

The Photo-Response Non-Uniformity is a representation of the uniformity of the response of the image sensor to light, which is important in some applications with bright light. If light is captured by the image sensor, the number of the photoelectrons captured by each pixel during exposure is measured and in particular recorded as a digital grey level value (ADU). This conversion of electrons into ADUs follows a certain ratio of ADU per electron, which is preferably referred to as conversion gain, plus a fixed offset value (typically 100 ADU). These values are determined by an analog-digital converter used for the conversion and amplifier.

CMOS cameras for example achieve their speed and low noise by parallel operation with one or more analog-digital converters per column of the camera and one amplifier per pixel. This can be a possibility of representing small fluctuations in gain and offset from pixel to pixel. Fluctuations of this offset value can result in fixed pattern noise at low light, which can thus be represented. The PRNU represents all of the fluctuations in the gain, the ratio of detected electrons to displayed ADU. It represents the standard deviation of the gain values of the pixels. Since the resulting difference of the intensity values depends on the magnitude of the signals, it can be represented in percent.

Next, the first noise profile and the second noise profile are compared to each other. Therein, differences in the values can be determined, e.g., by analysis of the two noise profiles. Hereto, a degree of a correspondence can be determined, which can in particular be indicated in percent.

This percentage value is used in a further step 106 to consider if the image sensor can be authenticated. In particular, the image sensor can be authenticated if the correspondence between the first noise profile and the second noise profile is at least 60%. Preferably the value is 70% or more, whereby the probability is increased that the image sensor has not been exchanged. In order to further increase the probability, the value of the correspondence is more than 80%, preferably even more than 90%. In one or more implementations, if the image sensor is not authenticated in step 106, the control device outputs an error message indicating that the image sensor is not authenticated, for example, to a display device that displays the error message.

Overall, the examples show how a method for authenticating an image sensor can be provided.

German patent application no. 10 2023 132 251.6, filed Nov. 20, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A computer-implemented method for authenticating an image sensor that includes a plurality of pixels, comprising:

providing a camera for a motor vehicle which includes the image sensor;

ascertaining a first noise profile of the image sensor, including exposing the image sensor to a predetermined amount of light and measuring a first digital grey level value for each of pixels of the image sensor;

storing the first noise profile on a data memory;

ascertaining a second noise profile of the image sensor, including exposing the image sensor to the predetermined amount of light and measuring a second digital grey level value for each of pixels of the image sensor;

comparing the first noise profile stored on the data memory to the second noise profile; and authenticating the image sensor if a predetermined correspondence is determined in the comparing the first noise profile to the second noise profile, wherein the image sensor is authenticated if the predetermined correspondence is at least 60%.

2. The method according to claim 1, wherein the image sensor is authenticated if the predetermined correspondence is at least 70%.

3. The method according to claim 1, wherein the image sensor is authenticated if the predetermined correspondence is at least 80%.

4. The method according to claim 1, wherein the image sensor is authenticated if the predetermined correspondence is at least 90%.

5. The method according to claim 1, wherein a control device of the motor vehicle includes the data memory.

6. The method according to claim 5, wherein the comparing and the authenticating are performed by the control device.

7. The method according to claim 1, wherein the first noise profile and the second noise profile are ascertained based on a same approach.

8. The method according to claim 1, wherein the first noise profile and the second noise profile are ascertained based on a Photo Response Non-Uniformity of the image sensor.

9. The method according to claim 1, wherein the ascertaining the first noise profile or the ascertaining the second noise profile is performed based on black pixels corresponding to no ambient light or ambient light below a predetermined threshold value.

10. A computer-implemented for authenticating an image sensor that includes a plurality of pixels, comprising:

providing a camera for a motor vehicle which includes the image sensor;

ascertaining a first noise profile of the image sensor, including exposing the image sensor to a predetermined amount of light and measuring a first digital grey level value for each of pixels of the image sensor;

storing the first noise profile on a data memory;

ascertaining a second noise profile of the image sensor, including exposing the image sensor to the predetermined amount of light and measuring a second digital grey level value for each of pixels of the image sensor;

comparing the first noise profile stored on the data memory to the second noise profile; and authenticating the image sensor if a predetermined correspondence is determined in the comparing the first noise profile to the second noise profile, wherein the camera includes the data memory, and wherein the data memory of the camera is not overwritable after the first noise profile is stored on the data memory.

11. A computer-implemented method for authenticating an image sensor that includes a plurality of pixels, comprising:

providing a camera for a motor vehicle which includes the image sensor;
ascertaining a first noise profile of the image sensor, including exposing the image sensor to a predetermined amount of light and measuring a first digital grey level value for each of pixels of the image sensor;
storing the first noise profile on a data memory;
ascertaining a second noise profile of the image sensor, including exposing the image sensor to the predetermined amount of light and measuring a second digital grey level value for each of pixels of the image sensor;
comparing the first noise profile stored on the data memory to the second noise profile;
authenticating the image sensor if a predetermined correspondence is determined in the comparing the first noise profile to the second noise profile;
encrypting the first noise profile with a predetermined key; and
providing the predetermined key to a control device for decrypting the first noise profile encrypted by the encrypting.

12. The method according to claim 11, wherein the first noise profile encrypted by the encrypting is stored on the data memory.

13. A computer-implemented method for authenticating an image sensor that includes a plurality of pixels, comprising:
providing a camera for a motor vehicle which includes the image sensor;
ascertaining a first noise profile of the image sensor, including exposing the image sensor to a predetermined amount of light and measuring a first digital grey level value for each of pixels of the image sensor;
storing the first noise profile on a data memory;
ascertaining a second noise profile of the image sensor, including exposing the image sensor to the predetermined amount of light and measuring a second digital grey level value for each of pixels of the image sensor;
comparing the first noise profile stored on the data memory to the second noise profile; and
authenticating the image sensor if a predetermined correspondence is determined in the comparing the first noise profile to the second noise profile,
wherein the first noise profile and the second noise profile are ascertained based on a Dark Signal Non-Uniformity of the image sensor.

14. A non-transitory computer-readable storage medium storing commands that, when executed by a computer, cause the computer to perform the method according to claim 1.

15. A system comprising:
a processor; and
a memory storing program code that, when executed by the processor, causes the system to:
ascertain a first noise profile of an image sensor included in a motor vehicle, wherein image sensor includes a plurality of pixels, and wherein the image sensor is exposed to a predetermined amount of light and a first digital grey level value is measured for each of pixels of the image sensor;
store the first noise profile on a data memory;
ascertain a second noise profile of the image sensor included in the motor vehicle wherein the image sensor is exposed to the predetermined amount of light and a second digital grey level value is measured for each of pixels of the image sensor;
compare the first noise profile stored on the data memory to the second noise profile; and
authenticate the image sensor if a predetermined correspondence is determined by comparing the first noise profile to the second noise profile, wherein the image sensor is authenticated if the predetermined correspondence is at least 60%.

16. A motor vehicle comprising:
the system according to claim 15.

17. A system comprising:
a camera;
a processor; and
a memory storing program code that, when executed by the processor, causes the system to:
ascertain a first noise profile of an image sensor included in a motor vehicle, wherein image sensor includes a plurality of pixels, and wherein the image sensor is exposed to a predetermined amount of light and a first digital grey level value is measured for each of pixels of the image sensor;
store the first noise profile on a data memory;
ascertain a second noise profile of the image sensor included in the motor vehicle wherein the image sensor is exposed to the predetermined amount of light and a second digital grey level value is measured for each of pixels of the image sensor;
compare the first noise profile stored on the data memory to the second noise profile; and
authenticate the image sensor if a predetermined correspondence is determined by comparing the first noise profile to the second noise profile,
wherein the camera includes the data memory, and
wherein the data memory of the camera is not overwritable after the first noise profile is stored on the data memory.

18. A motor vehicle comprising:
the system according to claim 17.

19. A system comprising:
a processor; and
a memory storing program code that, when executed by the processor, causes the system to:
ascertain a first noise profile of an image sensor included in a motor vehicle, wherein image sensor includes a plurality of pixels, and wherein the image sensor is exposed to a predetermined amount of light and a first digital grey level value is measured for each of pixels of the image sensor;
store the first noise profile on a data memory;
ascertain a second noise profile of the image sensor included in the motor vehicle wherein the image sensor is exposed to the predetermined amount of light and a second digital grey level value is measured for each of pixels of the image sensor;
compare the first noise profile stored on the data memory to the second noise profile;
authenticate the image sensor if a predetermined correspondence is determined by comparing the first noise profile to the second noise profile;
encrypt the first noise profile with a predetermined key; and
provide the predetermined key to a control device for decrypting the first noise profile after the first noise profile is encrypted.

20. A motor vehicle comprising:
the system according to claim 19.

21. A system comprising:
a processor; and
a memory storing program code that, when executed by the processor, causes the system to:

ascertain a first noise profile of an image sensor included in a motor vehicle, wherein image sensor includes a plurality of pixels, and wherein the image sensor is exposed to a predetermined amount of light and a first digital grey level value is measured for each of pixels of the image sensor;

store the first noise profile on a data memory;

ascertain a second noise profile of the image sensor included in the motor vehicle wherein the image sensor is exposed to the predetermined amount of light and a second digital grey level value is measured for each of pixels of the image sensor;

compare the first noise profile stored on the data memory to the second noise profile; and authenticate the image sensor if a predetermined correspondence is determined by comparing the first noise profile to the second noise profile, wherein the first noise profile and the second noise profile are ascertained based on a Dark Signal Non-Uniformity of the image sensor.

22. A motor vehicle comprising:

the system according to claim 21.

* * * * *